US012766523B2

(12) United States Patent
Park et al.

(10) Patent No.: US 12,766,523 B2
(45) Date of Patent: Oct. 20, 2026

(54) ELECTRIFICATION UNIT AND ELECTROSTATIC PRECIPITATOR COMPRISING SAME

(71) Applicant: Hanon Systems, Daejeon (KR)

(72) Inventors: Ji-Yong Park, Daejeon (KR); Jae Ho Kim, Daejeon (KR); Su Jin Woo, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 196 days.

(21) Appl. No.: 18/284,565

(22) PCT Filed: Jul. 6, 2022

(86) PCT No.: PCT/KR2022/009769
§ 371 (c)(1),
(2) Date: Sep. 28, 2023

(87) PCT Pub. No.: WO2023/075077
PCT Pub. Date: May 4, 2023

(65) Prior Publication Data
US 2024/0157374 A1 May 16, 2024

(30) Foreign Application Priority Data
Oct. 26, 2021 (KR) ........................ 10-2021-0143608

(51) Int. Cl.
*B03C 3/41* (2006.01)
*B03C 3/08* (2006.01)

(52) U.S. Cl.
CPC .................. *B03C 3/41* (2013.01); *B03C 3/08* (2013.01); *B03C 2201/04* (2013.01)

(58) Field of Classification Search
CPC .... B03C 3/08; B03C 3/12; B03C 3/34; B03C 3/38; B03C 3/40; B03C 3/41; B03C 3/45;
(Continued)

(56) References Cited

U.S. PATENT DOCUMENTS 3,997,304 A * 12/1976 Carr .......................... B03C 3/86 96/90
4,022,594 A * 5/1977 Baysek ..................... B03C 3/86 96/90
(Continued)

FOREIGN PATENT DOCUMENTS

CN 1542347 11/2004
CN 2010058061 3/2010
5,290,343 A 3/1994 Morita et al.
5,993,520 A 11/1999 Yu
2007/0028775 A1 * 2/2007 Loup B03C 3/41 96/96
(Continued)

OTHER PUBLICATIONS

International Search Report issued in PCT/KR2022/009769 on Oct. 19, 2022.
(Continued)

*Primary Examiner* — Jennifer Dieterle
*Assistant Examiner* — Sonji Turner
(74) *Attorney, Agent, or Firm* — NORTON ROSE FULBRIGHT US LLP

(57) ABSTRACT

The present invention relates to an electrification unit of an electrostatic precipitator, and more particularly, to an electrification unit having a discharge electrode, which connects a plurality of unit discharge electrodes in a row by means of a connecting terminal, and a groove-shaped fixing structure provided in a casing so that the connecting terminal and a connection part of the unit discharge electrode can be simply fixedly inserted into the corresponding groove, thereby providing excellent assemblability and electrical insulation and improving manufacturability and electrical stability.

18 Claims, 10 Drawing Sheets

(58) Field of Classification Search
CPC .... B03C 3/47; B03C 3/70; B03C 3/82; B03C 3/86; B03C 2201/04; Y02A 50/2351; F24F 13/20; F24F 3/16
See application file for complete search history.

(56) References Cited

U.S. PATENT DOCUMENTS

| | | | | |
|---|---|---|---|---|
| 2012/0160106 | A1 | 6/2012 | Ji et al. | |
| 2015/0290352 | A1* | 10/2015 | Ota | B03C 3/368 422/121 |
| 2017/0120181 | A1* | 5/2017 | Jeon | F24F 13/20 |
| 2017/0120182 | A1* | 5/2017 | Kim | F24F 11/30 |
| 2017/0120256 | A1* | 5/2017 | Jeon | B03C 3/60 |
| 2020/0230611 | A1* | 7/2020 | Park | B03C 3/12 |
| 2021/0031213 | A1* | 2/2021 | Damak | B03C 3/70 |

FOREIGN PATENT DOCUMENTS

| | | | |
|---|---|---|---|
| CN | 103623923 | 3/2014 | |
| CN | 103623924 | 3/2014 | |
| CN | 204254758 | 4/2015 | |
| CN | 205056235 | 3/2016 | |
| CN | 111450998 | 7/2020 | |
| KR | 20170082018 A * | 7/2017 | B03C 3/34 |
| KR | 20180090569 A | 8/2018 | |
| KR | 20190032107 A | 3/2019 | |
| KR | 20190061950 A | 6/2019 | |
| KR | 20200089857 A | 7/2020 | |

OTHER PUBLICATIONS

English translation of Official Action issued Oct. 29, 2025 in related Chinese Patent Application No. 202280026280.6 , 12 pgs.

Official Action issued Dec. 12, 2025 in related Korean Patent Application No. 10- 2021-0143608, 8 pgs.

Dongzhen, Z., Design, Construction, Operation, And Improvement Of Dust Collection And Flue Gas Treatment Systems, China National Knowledge Infrastructure, Issue 5, 1999, pp. 32-36, machine translation of English abstract.

* cited by examiner

1

ELECTRIFICATION UNIT AND ELECTROSTATIC PRECIPITATOR COMPRISING SAME

CROSS REFERENCE TO RELATED APPLICATIONS

This patent application is a national phase under 35 U.S.C. § 371 of International Patent Application No. PCT/KR2022/009769 filed Jul. 6, 2022, which claims the benefit of priority from Korean Patent Application No. 10-2021-0143608 filed Oct. 26, 2021, each of which is hereby incorporated herein by reference in its entirety for all purposes.

TECHNICAL FIELD

The present invention relates to an electrification unit of an electrostatic precipitator, and more particularly, to an electrification unit having a discharge electrode, which connects a plurality of unit discharge electrodes in a row by means of a connecting terminal, and a groove-shaped fixing structure provided in a casing so that the connecting terminal and a connection part of the unit discharge electrode can be simply fixedly inserted into the corresponding groove, thereby providing excellent assemblability and electrical insulation and improving manufacturability and electrical stability.

BACKGROUND ART

Electrostatic precipitators are widely used for air conditioning devices, humidistats, and the like in buildings and vehicles. The electrostatic precipitator has a structure in which corona discharge discharges dust particles so that the dust particles have particular selected charges, and then a dust collection part collects the dust particles by means of an electrical attractive force.

FIG. 1 is a view illustrating a schematic structure of an electrostatic precipitator in the related art, FIG. 2 is a view illustrating a specific example of the electrification unit in the related art, and FIG. 3 is a view schematically illustrating structures of a discharge electrode and an electrification electrode of the electrification unit in the related art. As illustrated, an electrostatic precipitator 1 broadly includes an electrification unit 10 configured to form an electric field, and a dust collection part 20 configured to collect dust particles electrified by the electrification unit.

The electrification unit 10 includes a rim-shaped casing 11 having a central portion formed therethrough in a direction A in which dust is introduced, electrification plates 12 that are electrification electrodes provided in parallel with the direction in which dust is introduced, and a discharge wire 13 that is a discharge electrode disposed between the electrification plates 12. FIG. 2 is a view illustrating a specific example of the electrification unit in the related art and illustrates an arrangement structure of the casing 11, the electrification plate 12, and the discharge wire 13.

In general, because a high voltage is applied to the discharge electrode from a voltage source S, the discharge electrode is also called a high-pressure electrode. Because the electrification electrode is disposed in parallel with the discharge electrode while facing the discharge electrode, the electrification electrode is also called a counter electrode. Further, because the electrification electrode is grounded (GND), the electrification electrode is also called a ground electrode.

The electrification unit 10 serves to discharge electricity from dust particles. More specifically, the discharge wire 13, i.e., the discharge electrode receives a high voltage, the electrification plate 12, i.e., the electrification electrode receives a reference voltage or is grounded, and an electric field is formed between the discharge electrode and the electrification electrode, such that dust particles in the air have particular charges while the air passes through the electrification unit.

The dust collection part 20 is configured to use opposite charge characteristics and collect dust particles, which have particular charges, by means of an electrical attractive force through the electric discharge in the electrification unit 10. The dust collection part 20 may have electrodes for collecting dust and collect the electrified dust particles by applying voltages to the electrodes.

Meanwhile, the electrification unit of the electrostatic precipitator will be described with reference back to FIG. 3. The electrification unit 10 defines a high-pressure circuit by appropriately bending the discharge electrode 13 having a long wire shape and by disposing the discharge electrode 13 between the electrification electrodes 12. Therefore, it is necessary to effectively fix the wire 13 in the casing. Korean Patent Application Laid-Open No. 2017-0082018 discloses a structure of an electrification unit in which a separate plate-shaped electrode connection part is provided to fix a plurality of wires in a casing of the electrification unit, and a wire connected to a spring for maintaining tension is fixed by being caught by a hook provided on the plate-shaped electrode connection part.

However, in case that electrodes of the electrification unit are connected by the above-mentioned structure, an electric discharge may occur on the hook by which the wire or spring is caught. Further, an abnormal electric discharge occurs, which may cause a problem with EMC and a function of electrifying dust. Further, a structure is complicated, which degrades assemblability.

Document of Related Art

Korean Patent Application Laid-Open No. 2017-0082018 (Jul. 13, 2017)

DISCLOSURE

Technical Problem

The present invention has been made in an effort to solve the above-mentioned problem, and an object of the present invention is to provide an electrification unit of an electrostatic precipitator, and more particularly, to an electrification unit having a discharge electrode, which connects a plurality of unit discharge electrodes in a row by means of a connecting terminal, and a groove-shaped fixing structure provided in a casing so that the connecting terminal and a connection part of the unit discharge electrode can be simply fixedly inserted into the corresponding groove, thereby providing excellent assemblability and electrical insulation and improving manufacturability and electrical stability.

Technical Solution

An electrification unit according to an example of the present invention is configured to apply electric charges to dust particles by receiving a voltage and includes: a casing having a rim shape; a plurality of electrification electrodes disposed in the casing and spaced apart from one another;

and a discharge electrode disposed between the plurality of electrification electrodes and spaced apart from the plurality of electrification electrodes, in which the discharge electrode includes a plurality of unit discharge electrodes connected in a row, in which the two adjacent unit discharge electrodes are connected to each other by means of a connecting terminal, and in which a connecting terminal fixing structure for accommodating the connecting terminal is provided in the casing.

Connection parts may be respectively provided at two opposite ends of each of the plurality of unit discharge electrodes, the unit discharge electrode of the two adjacent unit discharge electrodes, which is positioned at one side of the connecting terminal, may be a first unit discharge electrode, the unit discharge electrode positioned at the other side of the connecting terminal may be a second unit discharge electrode, one side of the connecting terminal may be connected to the other side connection part of the first unit discharge electrode, the other side of the connecting terminal may be connected to one side connection part of the second unit discharge electrode, and the other side connection part of the first unit discharge electrode, the connecting terminal, and one side connection part of the second unit discharge electrode may be fixed by means of the connecting terminal fixing structure.

The connecting terminal fixing structure may include a groove having a shape corresponding to the connecting terminal, and the other side connection part of the first unit discharge electrode, the connecting terminal, and one side connection part of the second unit discharge electrode may be inserted into the groove.

The connecting terminal fixing structure may be formed in the form of a partition wall protruding by a predetermined height from a bottom surface of the casing, and a portion of the partition wall of the connecting terminal may protrude higher than the connecting terminal inserted into the connecting terminal fixing structure and the connection part of the unit discharge electrode.

A guide groove through which the unit discharge electrode passes may be formed in a wall of the connecting terminal fixing structure.

The connecting terminal may have a plate shape and include a middle portion and end portions respectively provided at two opposite ends of the middle portion.

One end portion of the connecting terminal and the other side connection part of the first unit discharge electrode may be stacked on each other, and the other end portion of the connecting terminal and one side connection part of the second unit discharge electrode may be stacked on each other.

One end portion of the connecting terminal and the other side connection part of the first unit discharge electrode may have the same cross-sectional shape, and the other end portion of the connecting terminal and one side connection part of the second unit discharge electrode may have the same cross-sectional shape.

Through-holes may be respectively formed in one end portion and the other end portion of the connecting terminal, a through-hole may be formed in the other side connection part of the first unit discharge electrode, a through-hole may be formed in one side connection part of the second unit discharge electrode, one end portion of the connecting terminal and the other side connection part of the first unit discharge electrode may be fastened to each other by means of fastening means that penetrate the through-hole of one end portion of the connecting terminal and the through-hole of the other side connection part of the first unit discharge electrode, and the other end portion of the connecting terminal and one side connection part of the second unit discharge electrode may be fastened to each other by means of fastening means that penetrate the through-hole of the other end portion of the connecting terminal and the through-hole of one side connection part of the second unit discharge electrode.

The fastening means may be a bolt, and a screw groove having a screw thread formed therein may be formed in a bottom of the connecting terminal fixing structure so that the bolt is fastened to the screw groove.

The middle portion of the connecting terminal may be elongated, and a width of the end portion may be larger than a width of the middle portion.

Upper exposed portions of the other side connection part of the first unit discharge electrode, the connecting terminal, and one side connection part of the second unit discharge electrode may be coated with an insulating material.

A cover may be provided on upper exposed portions of the other side connection part of the first unit discharge electrode, the connecting terminal, and one side connection part of the second unit discharge electrode and close the upper exposed portions.

The connecting terminal fixing structure may be provided at one rim side of the casing.

Among the plurality of unit discharge electrodes, the unit discharge electrode positioned at one side outermost periphery may be a third unit discharge electrode, the unit discharge electrode positioned at the other side outermost periphery may be a fourth unit discharge electrode, one side fixing structure for accommodating one side connection part of the third unit discharge electrode may be further provided in the casing, and the other side fixing structure for accommodating the other side connection part of the fourth unit discharge electrode may be further provided in the casing.

A groove having a shape corresponding to one side connection part of the third unit discharge electrode may be formed in one side fixing structure, one side connection part of the third unit discharge electrode may be inserted into the groove of one side fixing structure, a groove having a shape corresponding to the other side connection part of the fourth unit discharge electrode may be formed in the other side fixing structure, and the other side connection part of the fourth unit discharge electrode may be inserted into the groove of the other side fixing structure.

The casing may have a structure made by coupling a casing main body and a casing cover, and the casing cover may include: a first casing cover detachably provided at one rim side inside the casing main body and configured to close one rim side; and a second casing cover detachably provided at the other rim side inside the casing main body and configured to close the other rim side.

The discharge electrode may be configured as a wire, the wire may include a plurality of unit wires connected in a row, and the two adjacent unit wires, among the unit wires connected in a row, may be connected to each other by means of the connecting terminal.

The plurality of unit wires may each define a closed loop as a whole and be disposed to surround any one of the plurality of electrification electrodes.

An electrostatic precipitator according to another example of the present invention may include the electrification unit; and a dust collection part configured to collect dust particles having passed through the electrification unit.

Advantageous Effects

According to the present invention, the discharge electrode connects the plurality of unit discharge electrodes in a row by means of the connecting terminal, and the groove-shaped fixing structure is provided in the casing so that the connecting terminal and the connection part of the unit discharge electrode may be simply fixedly inserted into the corresponding groove, thereby providing excellent assemblability and electrical insulation and improving manufacturability and electrical stability.

BEST MODE

Hereinafter, the present invention will be described with reference to the accompanying drawings.

Figure 1:
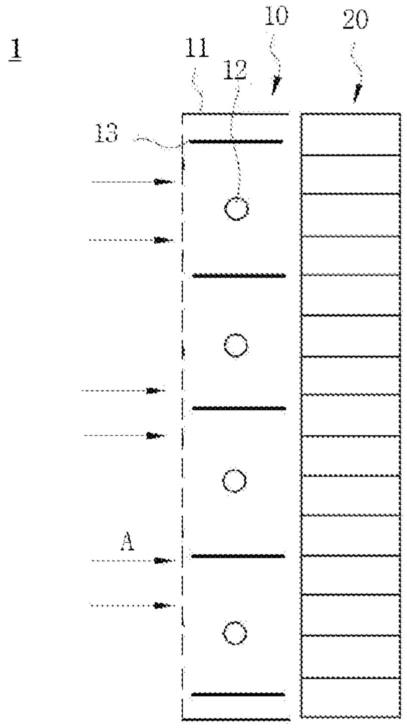
FIG. 1 is a view illustrating a schematic structure of an electrostatic precipitator in the related art.
Figure 2:
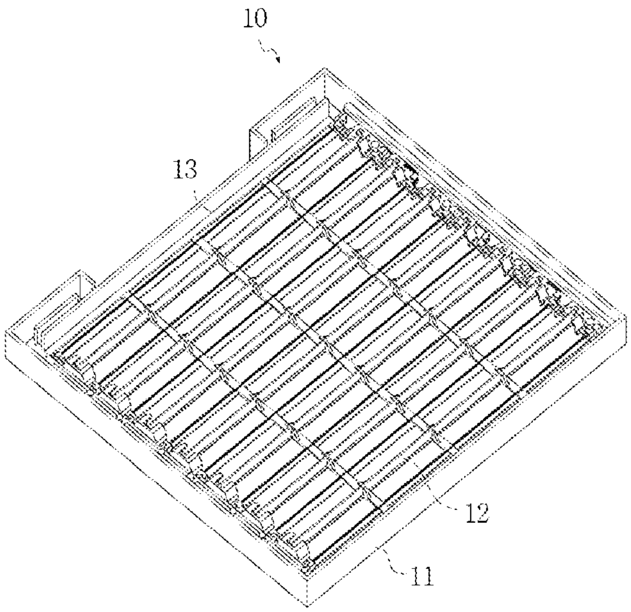
FIG. 2 is a view illustrating a specific example of the electrification unit in the related art.
Figure 3:
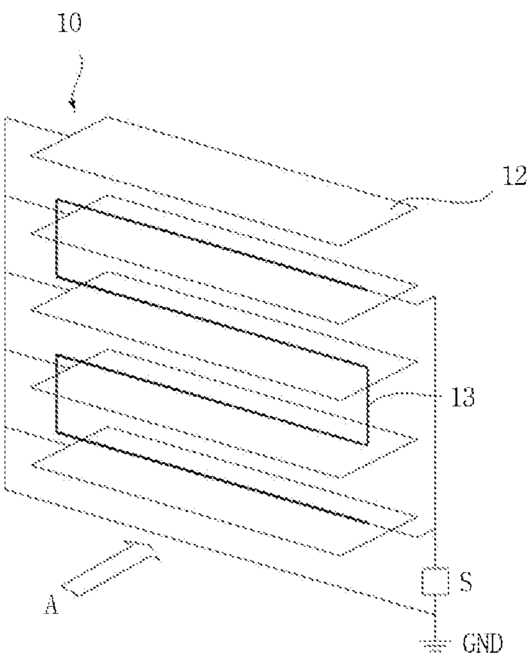
FIG. 3 is a view schematically illustrating structures of a discharge electrode and an electrification electrode of the electrification unit in the related art.
Figure 4:
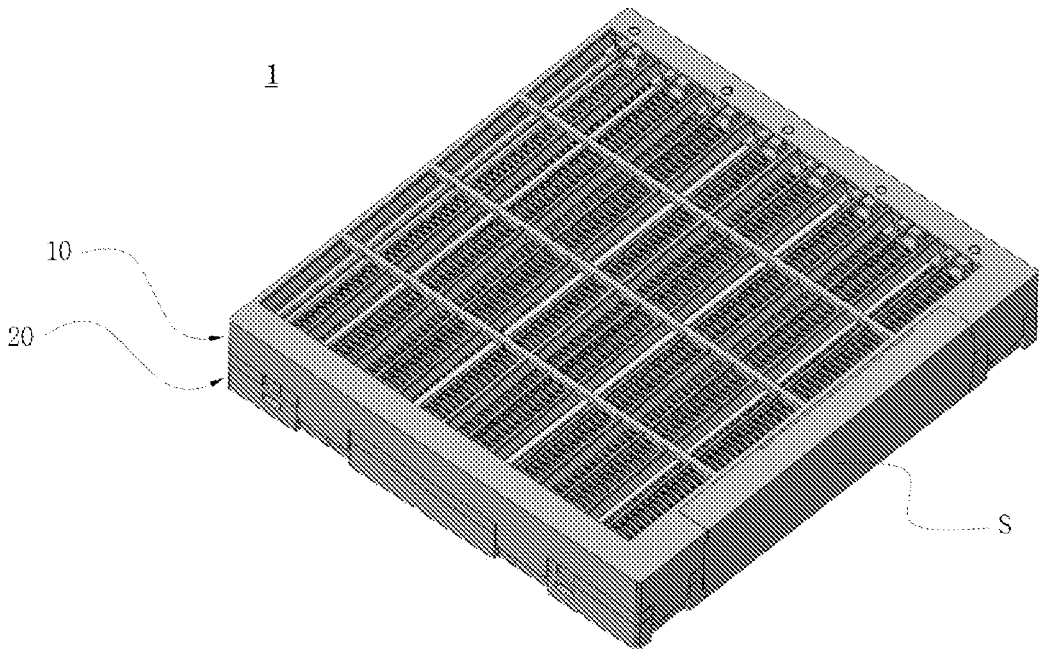
FIG. 4 is a perspective view of an electrostatic precipitator according to an example of the present invention.
Figure 5:
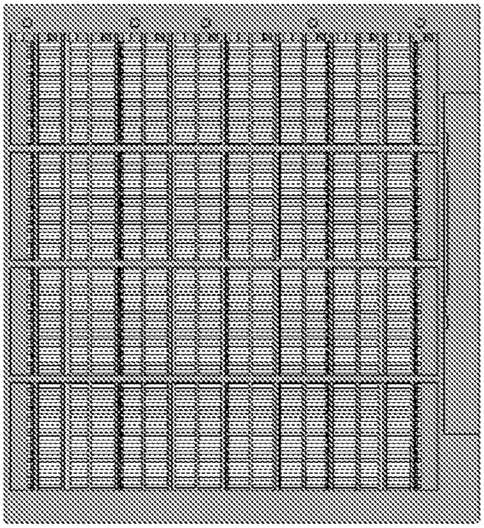
FIG. 5 is a top plan view of FIG. 4 when viewed from above.

FIG. 4 is a perspective view of an electrostatic precipitator according to an example of the present invention, and FIG. 5 is a top plan view of FIG. 4 when viewed from above. As illustrated, an electrostatic precipitator 1 of the present invention may broadly include an electrification unit 10 and a dust collection part 20.

The electrification unit 10 serves to apply electric charges to dust particles suspended in the air by receiving voltages. The electrification unit 10 may be one component of the electrostatic precipitator 1, and a voltage source S may be provided inside or outside a casing 100.

The dust collection part 20 serves to collect dust particles having passed through the electrification unit 10. The dust collection part 20 may be another component of the electrostatic precipitator 1. The dust collection part 20 and the electrification unit 10 may be configured as a set.

That is, the electrification unit 10 and the dust collection part 20 are provided in the form of modules stacked vertically and coupled to each other and structured such that the air is introduced into the electrification unit 10 disposed at an upper side based on the drawings and passes through the dust collection part 20 disposed at a lower side.

Hereinafter, the electrification unit 10 will be described first.

Figure 6:
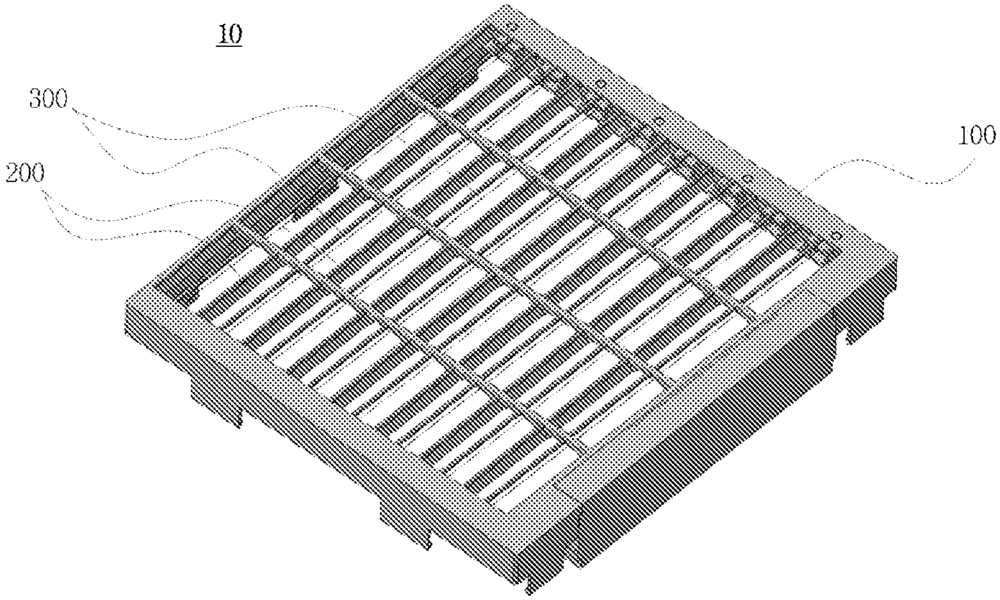
FIG. 6 is a perspective view of the separated electrification unit in FIG. 4.
Figure 7:
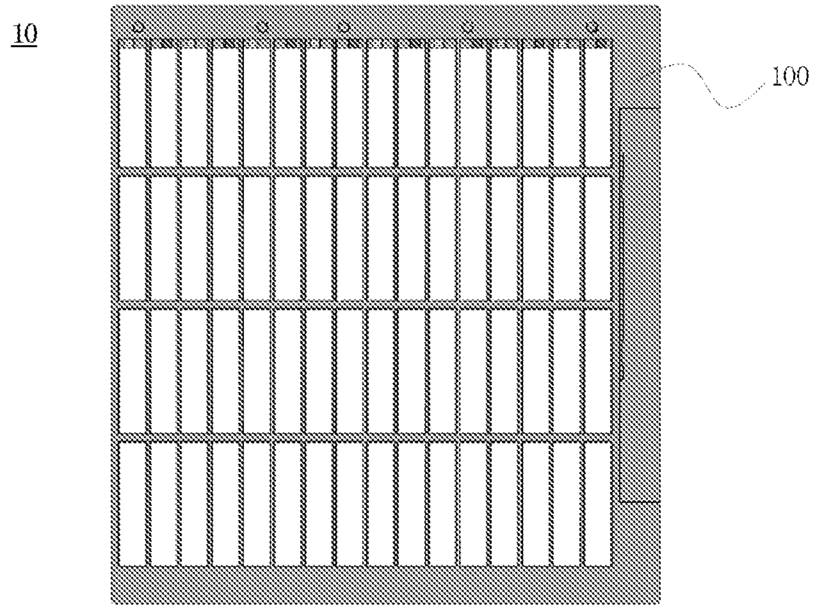
FIG. 7 is a top plan view of FIG. 6 when viewed from above.
Figure 8:
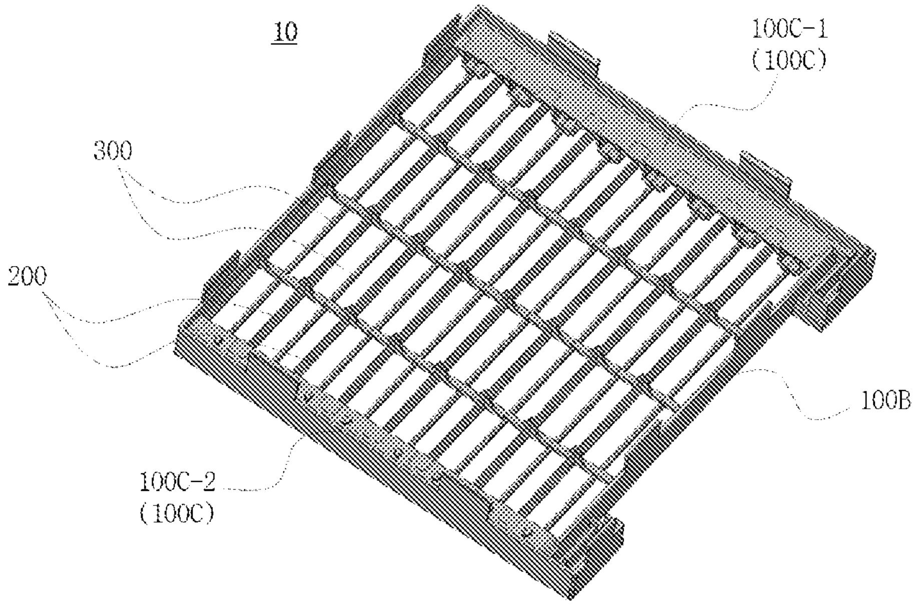
FIG. 8 is a perspective view of FIG. 6 when viewed from below.
Figure 9:
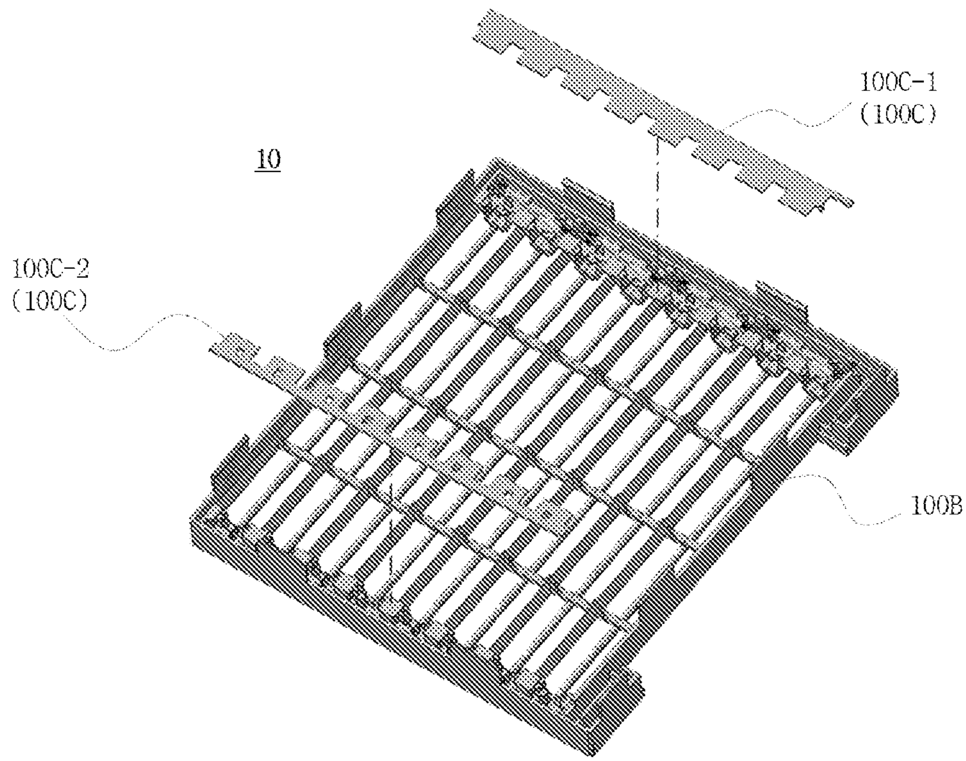
FIG. 9 is an exploded perspective view of a separated cover in FIG. 6.

FIG. 6 is a perspective view of the separated electrification unit in FIG. 4, FIG. 7 is a top plan view of FIG. 6 when viewed from above, FIG. 8 is a perspective view of FIG. 6 when viewed from below, and FIG. 9 is an exploded perspective view of a separated cover in FIG. 6. As illustrated, the electrification unit 10 of the present invention may broadly include the casing 100, electrification electrodes 200, and discharge electrodes 300.

The casing 100 may be configured in the form of a rim. More specifically, the casing 100 may be formed in a rim shape having a central portion formed therethrough so that dust particles may pass through the central portion, such that the air may be introduced into the penetrated central portion and pass through the central portion. As illustrated, the casing 100 may be formed in a quadrangular shape as a whole. Alternatively, the casing 100 may be formed in a circular to polygonal shape.

In addition, the casing 100 may have a structure made by coupling a casing main body 100B and casing covers 100C. In this case, the casing covers 100C may include a first casing cover 100C-1 and a second casing cover 100C-2 respectively and detachably provided at one rim side and the other rim side inside the casing main body 100B and configured to respectively close one rim side and the other rim side. As described above, because the casing covers 100C are detachably provided, the ease of production may be improved. Further, because the rim portions provided at one side and the other side and disposed inside the casing are closed by the casing covers 100C, the constituent elements, which are provided on the corresponding rim portions, e.g., connecting terminals 400, connecting terminal fixing structures 110, and the like, which will be described below, may be protected, and electrical insulation with the outside may be improved.

The plurality of electrification electrodes 200 may be disposed in the casing 100 and spaced apart from one another. As illustrated, the electrification electrode 200 may have a plate shape elongated in one direction, and one side and the other side of the electrification electrode 200 may be fixedly coupled to the casing 100. Various structures for coupling the electrification electrode 200 to the casing 100 may be applied. For example, the casing 100 may have accommodation grooves (not illustrated) that accommodate two opposite ends of the electrification electrode 200. After the electrification electrode is inserted, seated, or coupled into the corresponding accommodation grooves, the electrification electrode 200 may be finally fixedly coupled to the casing 100 by using an additional fixing member (not illustrated).

The discharge electrodes 300 may be disposed between the plurality of electrification electrodes 200 and spaced apart from the electrification electrodes 200. More specifically, as illustrated, the discharge electrode 300 may be a wire. The discharge electrode 300 may be bent multiple times and disposed between the electrification electrodes 200, thereby defining the high-pressure circuit in the casing 100.

Figure 10:
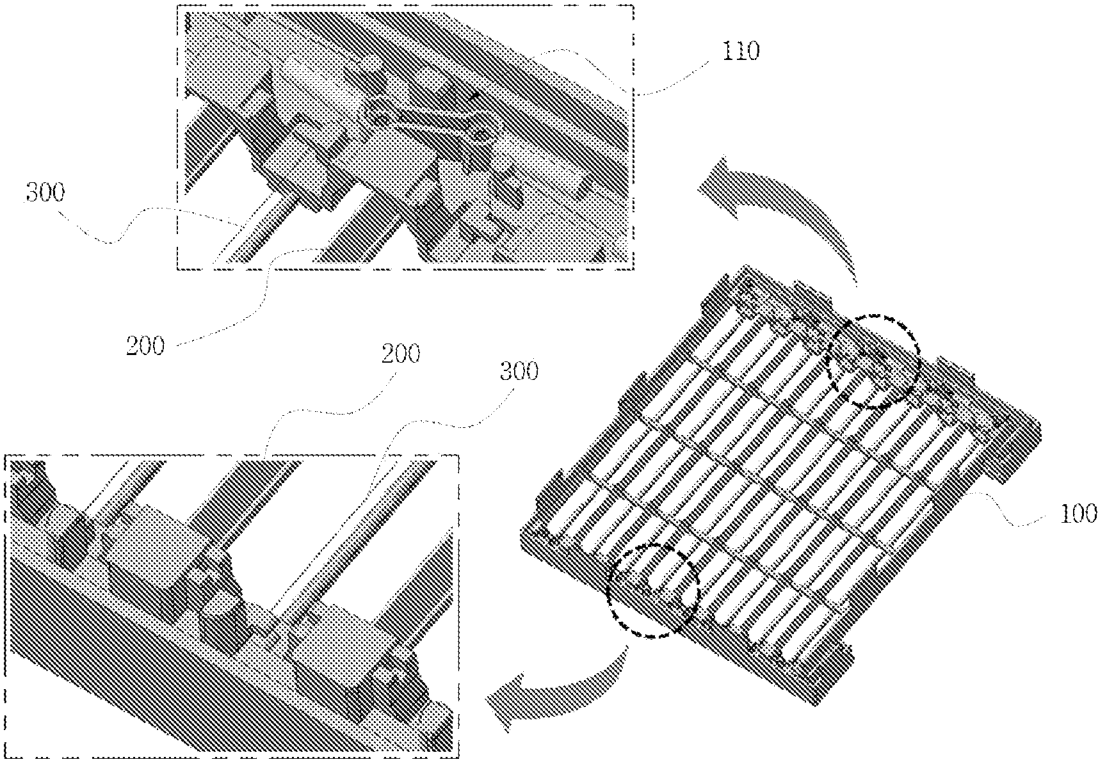
FIG. 10 is a view illustrating some enlarged points of a casing.
Figure 11:
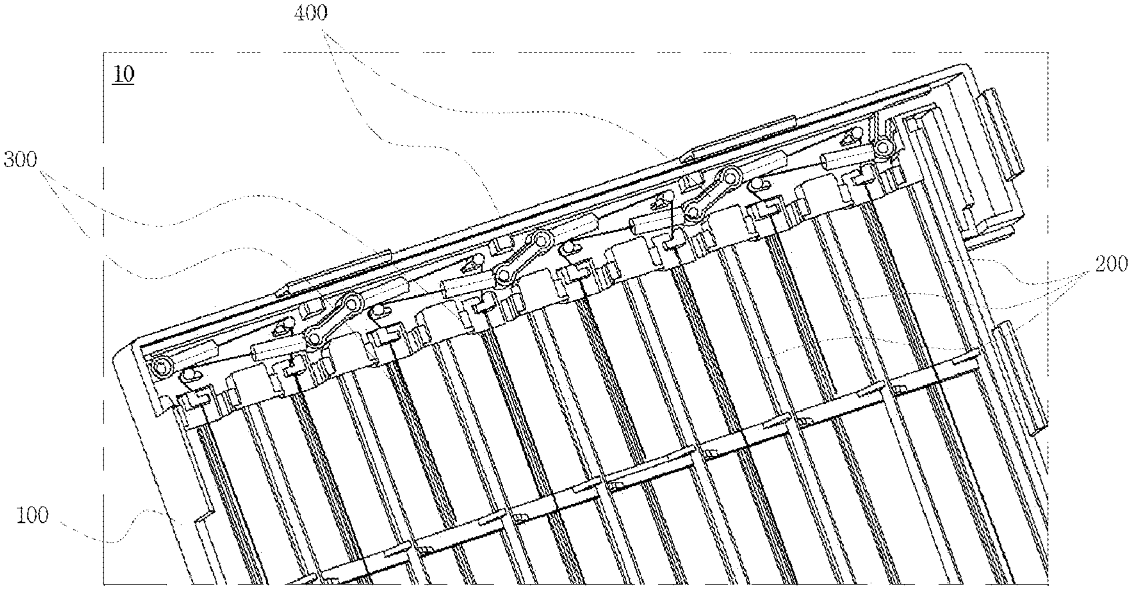
FIG. 11 is a detailed view of one side inside the casing.

FIG. 10 is a view illustrating some enlarged points of a casing, and FIG. 11 is a detailed view of one side inside the casing. As illustrated, the electrification unit 10 of the present invention may further include the connecting terminals 400 in addition to the casing 100, the electrification electrodes 200, and the discharge electrodes 300. The casing 100 may have the connecting terminal fixing structures 110 configured to accommodate the connecting terminals 400.

Figure 12:
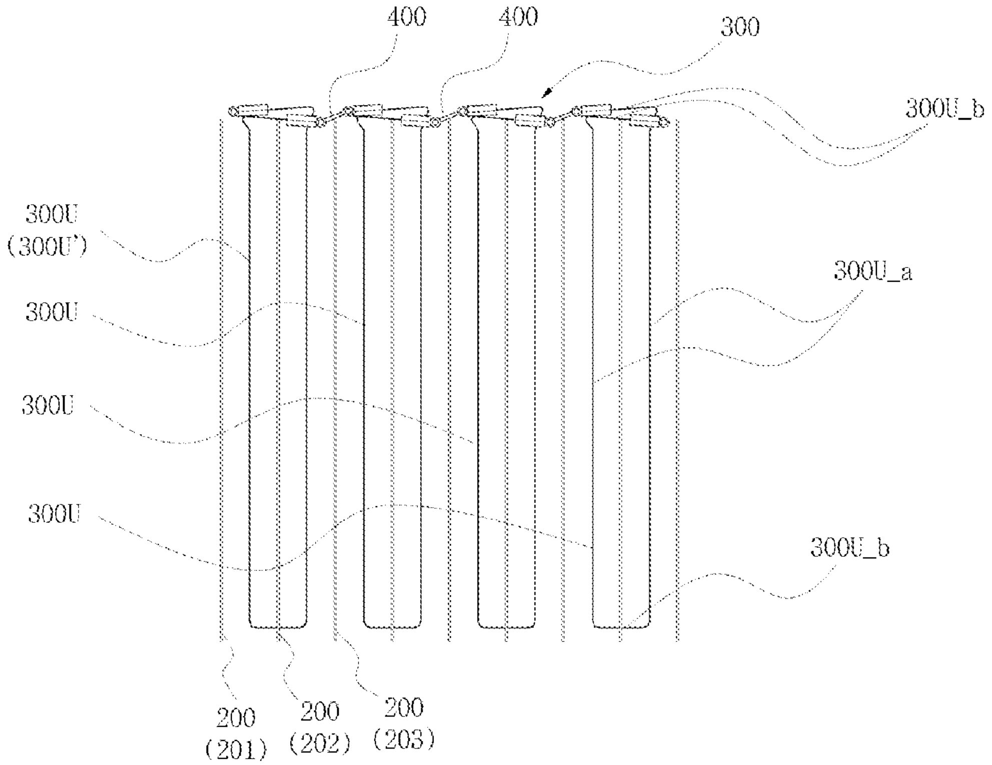
FIG. 12 is a view schematically illustrating a discharge electrode and an electrification electrode when viewed from above.

FIG. 12 is a view schematically illustrating the discharge electrode and the electrification electrode when viewed from above and illustrates the arrangement structure of the electrification electrode 200 and the discharge electrode 300 and a high-pressure circuit structure of the discharge electrode 300. Hereinafter, for convenience of description, the electrification electrode 200 will be referred to as an electrification plate 200, and the discharge electrode 300 will be referred to as a wire 300.

As illustrated in FIG. 12, in the electrification unit 10 of the present invention, the wire 300 may include a plurality of unit wires 300U. The plurality of unit wires 300U may be connected in a row, and the two adjacent unit wires 300U may be connected to each other by the connecting terminal 400. That is, the present invention may further include the connecting terminal 400, and the two adjacent unit wires 300U may be electrical and physically connected to each other by the connecting terminal 400.

Figure 13:
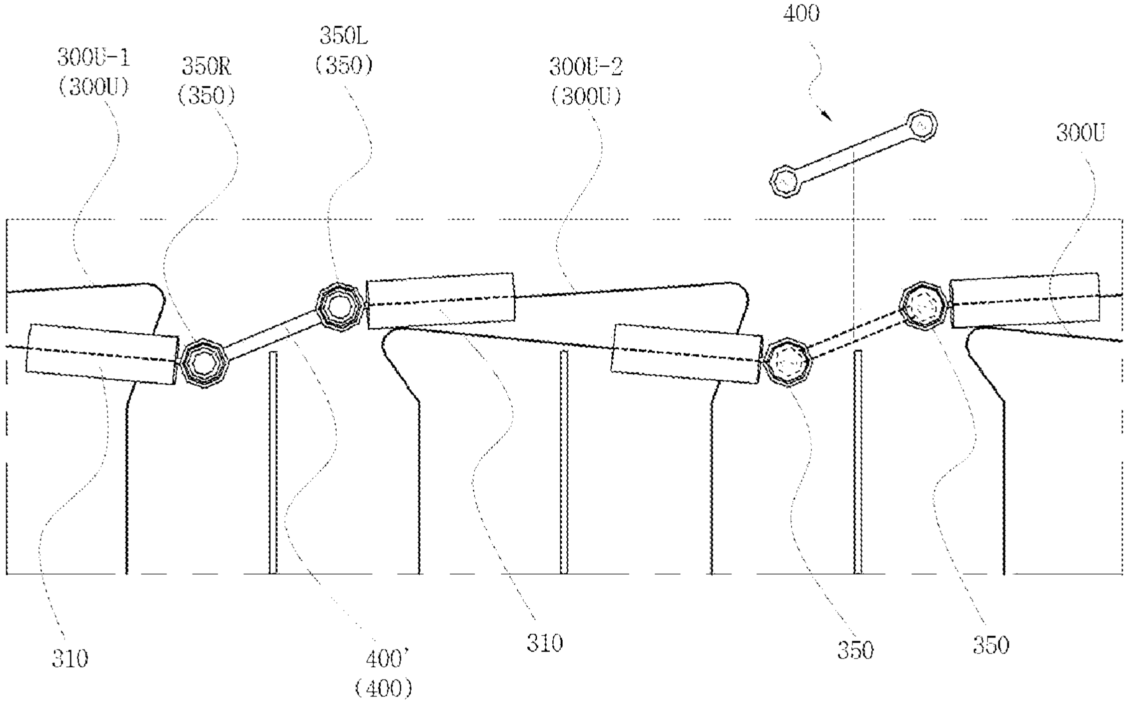
FIG. 13 is an enlarged view of a connection structure between a wire and a connecting terminal in FIG. 12.

FIG. 13 is an enlarged view of a connection structure between the wire and the connecting terminal in FIG. 12. As illustrated, connection parts 350 may be provided at two opposite ends of each of the unit wires 300U. One side of the connecting terminal 400 may be connected to a connection part 350R of the unit wire 300U positioned at one side (e.g., a left side based on the drawings) of the connecting terminal 400, and the other side of the connecting terminal 400 may be connected to a connection part 350L of the unit wire positioned at the other side (e.g., a right side based on the drawings) of the connecting terminal 400.

More specifically, springs 310 may be provided as tension maintaining means at the two opposite ends of each of the unit wires 300U, and the connection part 350 of the unit wire 300U may be provided outside the spring 310. As illustrated, the connecting terminals 400 may correspond in number to the unit wires 300U. In this case, based on any one connecting terminal 400', the unit wire 300U, which is positioned at one side (e.g., the left side based on the drawings) of the corresponding connecting terminal 400', is referred to as a first unit wire 300U-1, and the unit wire 300U, which is positioned at the other side (e.g., the right side based on the drawings) of the corresponding connecting terminal 400', is referred to as a second unit wire 300U-2. In this case, one side of the corresponding connecting terminal 400' may be connected to the other side connection part 350R of the first unit wire 300U-1, and the other side of the corresponding connecting terminal 400' may be connected to one side connection part 350L of the second unit wire 300U-2.

In the related art, an electrification unit, which is a single wire, is elongated and bent multiple times to define a high-pressure circuit. In contrast, in the present invention, the plurality of unit wires, which is separated to have a smaller size than the above-mentioned single wire, may be used to define the high-pressure circuit, which makes it easier to install and dispose the wire in the casing.

Figure 14:
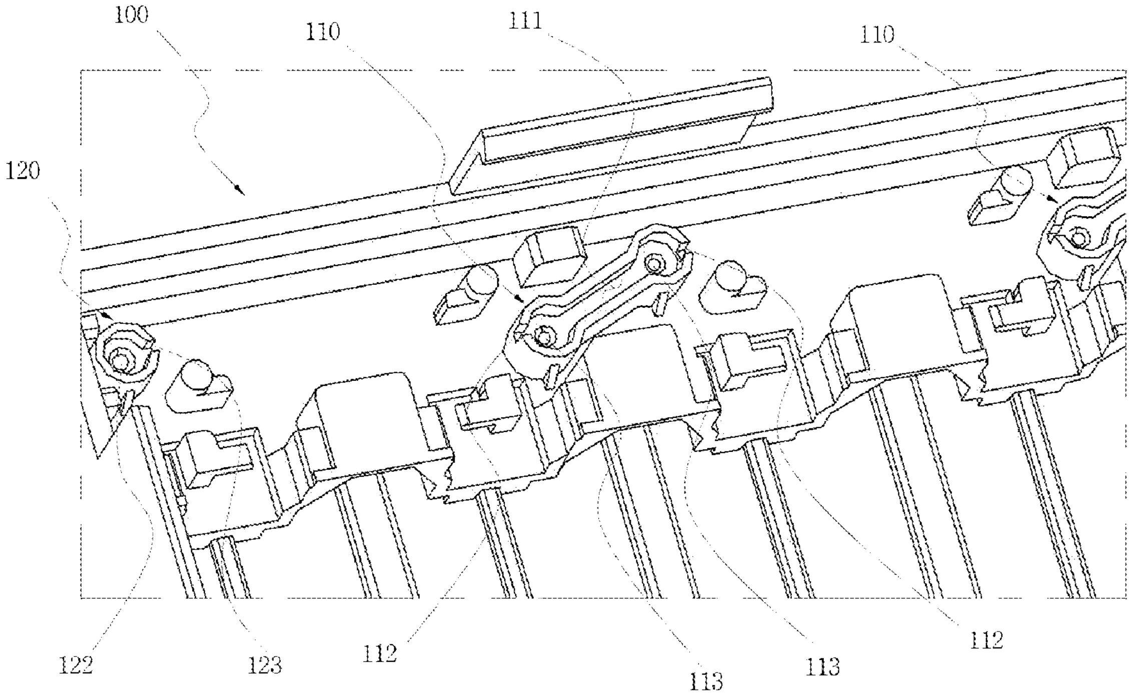
FIGS. 14 to 16 are views illustrating, in a stepwise manner, assembling structures of the discharge electrode according to the example of the present invention.
Figure 15:
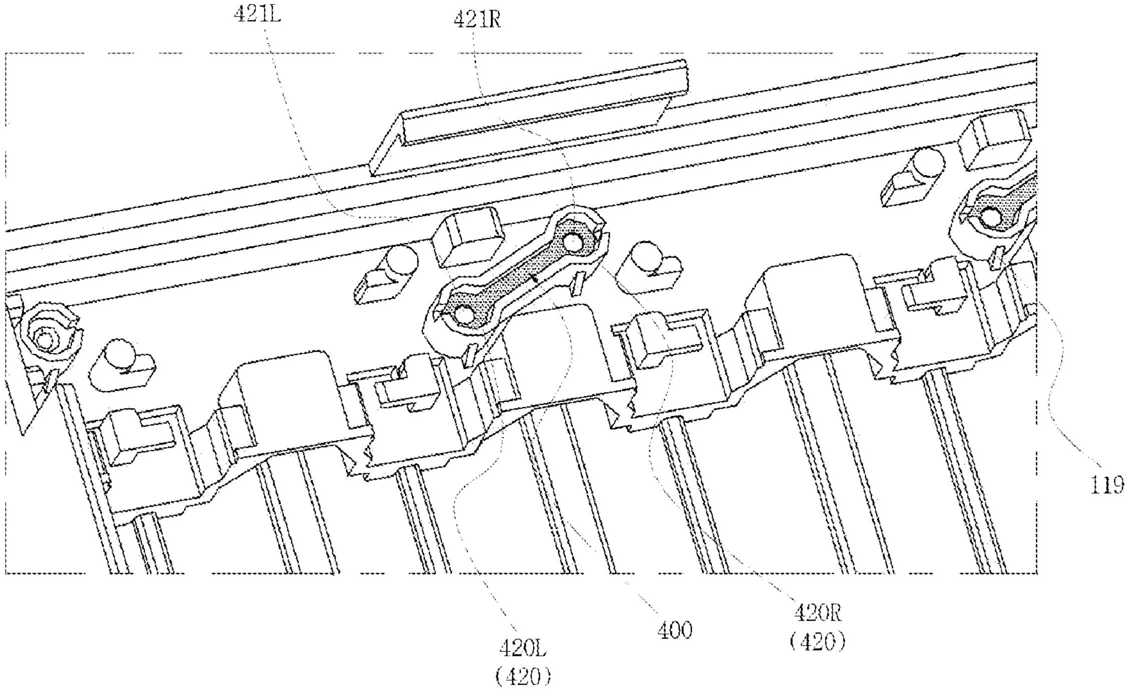
Figure 16:
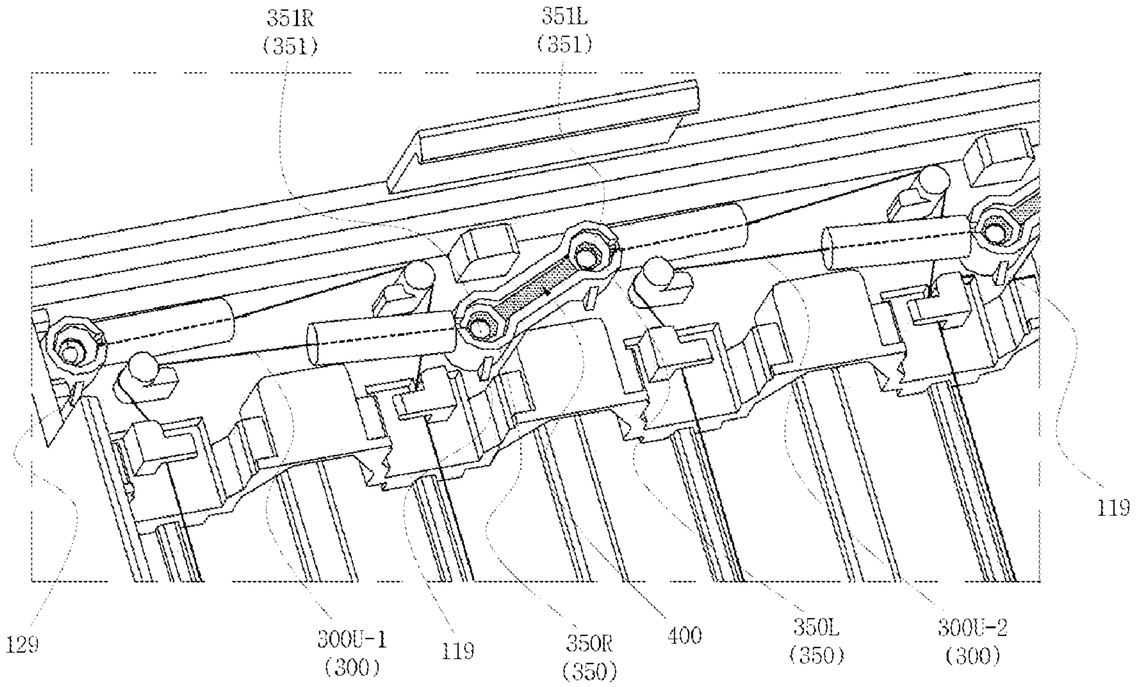

FIGS. 14 to 16 are views illustrating, in a stepwise manner, assembling structures of the discharge electrode according to the example of the present invention. FIG. 14 illustrates the casing, except for the wire, FIG. 15 illustrates that the connecting terminal in FIG. 14 is coupled, and FIG. 16 illustrates that the wire in FIG. 15 is coupled.

First, as illustrated in FIG. 14, the casing 100 of the present invention may have the connecting terminal fixing structure 110. The connecting terminal fixing structure 110 is structured to fixedly mount the two adjacent unit wires 300U on the casing 100. The connecting terminal fixing structures 110 may correspond in number to the unit wires 300U. The other side connection part 350R of the first unit wire, the connecting terminal 400, and one side connection part 350L of the second unit discharge electrode may be fixed by the connecting terminal fixing structure 110.

In the more specific embodiment, as illustrated, the connecting terminal fixing structure 110 may have a partition wall structure protruding upward by a predetermined height from a bottom surface of the casing 100. In this case, a groove 111 may be formed in a central portion of the connecting terminal fixing structure 110 and correspond to the connecting terminal 400. The other side connection part 350R of the first unit wire, the connecting terminal 400, and one side connection part 350L of the second unit wire may be fixedly inserted into the corresponding groove 111.

In this case, the partition wall structure of the connecting terminal fixing structure 110 may protrude higher than the connecting terminal 400 inserted into the groove 111 and the connection part 350 of the wire. That is, the partition wall structure may be formed to be higher than a height defined by stacking the connecting terminal 400 and the connection part 350 of the wire. Therefore, the connecting terminal and the wire may be temporarily assembled, which may improve the ease of production.

In addition, with reference to FIG. 16, the connecting terminal fixing structure 110 may have reinforcement ribs 119. The reinforcement rib 119 may protrude outward by a predetermined height from a lower side of the partition wall structure of the connecting terminal fixing structure 110. The plurality of reinforcement ribs 119 may be provided on the single connecting terminal fixing structure 110. The reinforcement ribs 119 may improve the supporting force and structural durability of the connecting terminal fixing structure 110 with respect to the bottom surface of the casing. In this case, tension is applied to two opposite sides of the connecting terminal fixing structure 110 by the unit wires 300U-1 and 300U-2 disposed at the two opposite sides, and thus the reinforcement ribs 119 may be formed at the two opposite sides of the fixing structure 110.

As described above, the connecting terminal fixing structure 110 having the groove 111 is provided in the casing 100, the connection parts 350 provided at the ends of the two opposite unit wires 300U are fixedly inserted into the corresponding groove 111, and the connecting terminal 400, which connects the connection parts 350 of the two opposite unit wires 300U, is fixedly inserted into the corresponding groove 111. Therefore, the plurality of unit wires may be electrically connected to one another at once and physically fixed to the casing without using a separate electrical structure.

That is, in the related art, a wire is fixed by being caught by a hook provided on a plate-shaped electrode connection part, which makes it difficult to perform the assembling process and causes the occurrence of electric discharge on the hook. In contrast, in the present invention, the positions of the unit wire and the connecting terminal may be fixed by simply inserting the unit wire and the connecting terminal into the groove of the connecting terminal fixing structure. Therefore, the present invention may be very advantageous in terms of assemblability and provide the excellent electrical insulation. Further, the present invention may also provide excellent electromagnetic interference (EMI)/electromagnetic compatibility (EMC) by preventing an abnormal electric discharge that may occur on an end connection part that is the connection part of the wire.

The connection structure of the wire of the present invention will be described in more detail with reference to FIGS. 14 to 16. In the present invention, the connecting terminal fixing structure 110 having the groove 111 formed in the form of the connecting terminal 400 may be provided in the casing 100, as illustrated in FIG. 14, the connecting terminal 400 may be inserted into the corresponding groove 111, as illustrated in FIG. 15, and then the connection part 350 of the unit wire 300U may be inserted into the corresponding groove 111, as illustrated in FIG. 16, such that the entire unit wire 300U may be connected.

Figure 17:
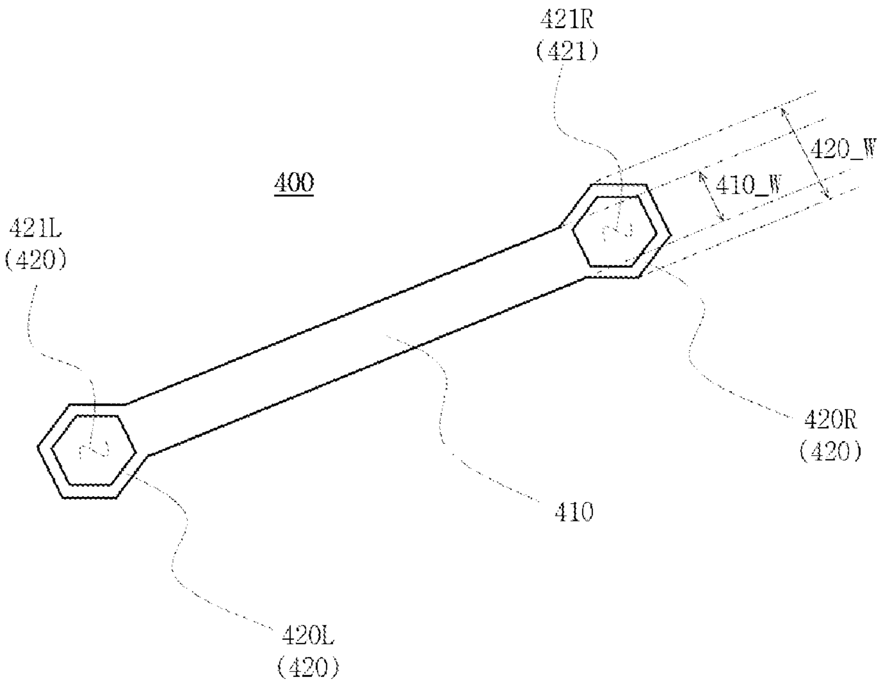
FIG. 17 is an enlarged view of the connecting terminal according to the example of the present invention.

FIG. 17 is an enlarged view of the connecting terminal according to the example of the present invention. The connecting terminal 400 may be provided in the form of a plate and include a middle portion 410 and end portions 420 provided at two opposite ends of the middle portion. Further, the middle portion 410 of the connecting terminal 400 is elongated. A width 420_W of the end portion 420 may be larger than a width 410_W of the middle portion 410. That is, the connecting terminal 400 may be a kind of busbar provided in the form of an open-end wrench, for example.

The connecting terminal 400 having the above-mentioned shape is inserted into the groove 111, and the connection parts 350, which are the ends of the unit wires 300U, are inserted into the positions of the two opposite end portions 420 of the connecting terminal 400, such that one end portion 420L of the connecting terminal 400 and the other side connection part 350R of the first unit wire may be stacked on each other, and the other end portion 420R of the connecting terminal and one side connection part 350L of the second unit wire are stacked on each other.

In this case, guide grooves 112, through which the unit wire 300U may pass, may be formed in a wall of the connecting terminal fixing structure 110. More specifically, the guide grooves 112 may be respectively formed at one side and the other side of the connecting terminal fixing structure 110. The guide groove 112 is formed to be opened at an upper side thereof, and the unit wire 300U is inserted into the opened upper side, such that the unit wire 300U penetrates the wall of the connecting terminal fixing structure 110 when viewed laterally.

Meanwhile, in the present invention, the connecting terminal 400 is inserted first into the groove 111 of the connecting terminal fixing structure 110, and then the connection part 350 of the unit wire 300U is inserted into the groove 111. However, the assembling sequence is not limited thereto.

In this case, one end portion 420L of the connecting terminal and the other side connection part 350R of the first wire may have the same cross-sectional shape, and the other end portion 420R of the connecting terminal and one side connection part 350L of the second wire may have the same cross-sectional shape. In this case, the term 'the same' means 'substantially the same' instead of 'physically the same', and the term 'the same cross-section' may include 'the same shape' and 'the same size'. For example, as illustrated, the end portion 420 of the connecting terminal and the connection part 350 of the wire may each have an approximately hexagonal cross-section. However, the present invention is not limited thereto, and the end portion 420 of the connecting terminal and the connection part 350 of the wire may each have a polygonal cross-sectional shape or a circular cross-sectional shape instead of a hexagonal cross-sectional shape. However, in comparison with the circular cross-sectional shape, the hexagonal cross-sectional shape may be more advantageous in preventing the connection part of the unit wire from rotating in the groove.

Further, one end portion 420L and the other end portion 420R of the connecting terminal may respectively have through-holes 421L and 421R, and the other side connection part 350R of the first unit wire and one side connection part 350L of the second unit wire may respectively have through-holes 351R and 351L. In this case, the present invention may further include fastening means that penetrate the corresponding through-holes. One end portion 420L of the connecting terminal and the other side connection part 350R of the first unit wire may be fastened to each other by means of the fastening means (not illustrated) that penetrates the through-hole 421L of one end portion of the connecting terminal and the through-hole 351R of the other side connection part of the first unit wire. The other end portion 420R of the connecting terminal and one side connection part 350L of the second unit wire may be fastened to each other by means of the fastening means that penetrates the through-hole 421R of the other end portion of the connecting terminal and the through-hole 351L of one side connection part of the second unit wire.

In this case, the fastening means may be a bolt, for example, and screw grooves 113 having screw threads formed therein may be formed in the bottom of the connecting terminal fixing structure 110 so that the bolts may be fastened to the screw grooves 113. As described above, the through-holes are respectively formed in the connection part of the wire and the end portions of the connecting terminal, and the connection part of the wire and the end portions of the connecting terminal are fastened to one another by using the bolts, such that the connection part and the connecting terminal may be conveniently and securely bound. In addition, the bolt itself may be made of an insulating material, thereby further improving the insulation.

Further, although not illustrated, the present invention may further include an insulating material or a cover. More specifically, with reference back to FIG. 16, in the state in which the connecting terminal 400 and the connection parts 350 of the unit wire are inserted into the groove 111 of the connecting terminal fixing structure 110, an upper side of the groove 111, i.e., upper sides of the connecting terminal 400 and the connection parts 350 of the unit wire and an upper side of the fastening means are exposed upward. In this state, to cover the exposed upper portion, an insulating material, such as silicone molding, may be further applied onto the corresponding exposed portion, or a cover may be further provided to close the exposed portion. The cover may have the same shape as the groove 111 and be structured to be inserted into the groove 111. The cover may also be made of an insulating material. As described above, the insulating means may be provided on the exposed portion of the connection portion between the unit wires, thereby improving the insulation performance.

Further, with reference back to FIG. 9, in the present invention, the connecting terminal fixing structures 110 may be provided at one rim side of the casing 100. That is, the connecting terminal fixing structures 110 may be provided to correspond in number to the connecting terminals 400. In this case, in case that the plurality of connecting terminal fixing structures 110 is provided, all the plurality of connecting terminal fixing structures 110 may be disposed at one side rim of the casing 100 in the same direction. This configuration assists in configuring the casing having a simple shape and also assists in improving the assemblability because the wire may be assembled in the casing in the same direction at the time of fastening the wire.

Figure 18:
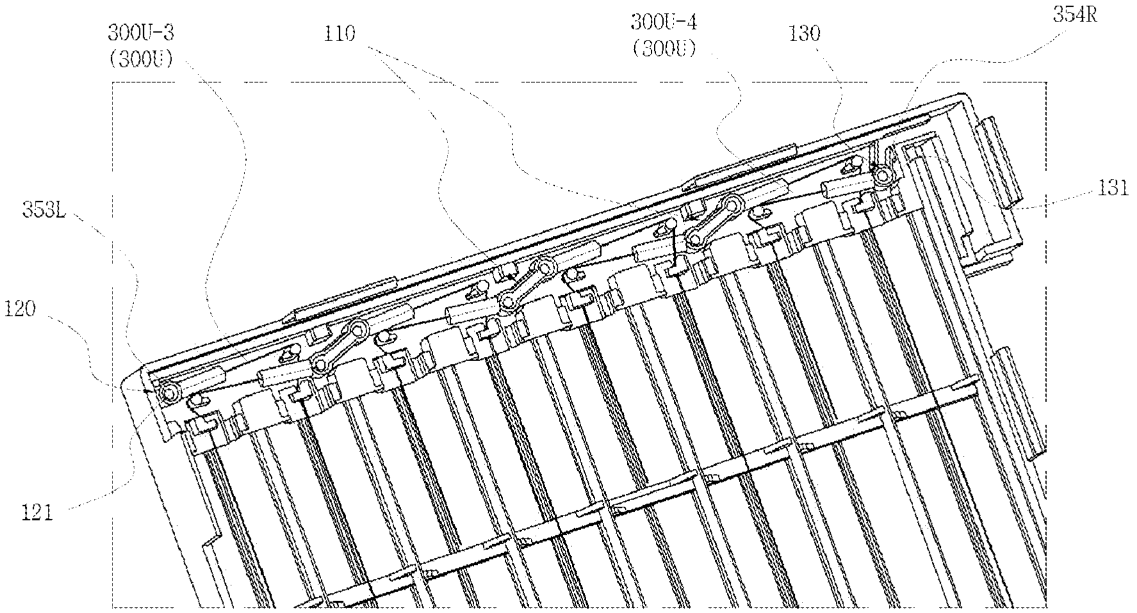
FIG. 18 is a view illustrating FIG. 16 again.

FIG. 18 is a view illustrating FIG. 11 again. As illustrated, one side fixing structure 120 and the other side fixing structure 130 may be further provided in the casing 100 of the present invention. More specifically, among the plurality of unit wires 300U, the unit wire 300U positioned at one side outermost periphery will be referred to as a third unit wire 300U-3, and the unit wire 300U positioned at the other side outermost periphery will be referred to as a fourth unit wire 300U-4. In this case, one side fixing structure 120 for fixing one side connection part 353L may be provided in the casing 100 in order to fix the third unit wire 300U-3, and the other side fixing structure 130 may be provided in the casing 100 in order to fix the other side connection part 354L of the fourth unit wire 300U-4.

In this case, a groove 121, which is formed in the form of one side connection part 353L of the third unit wire, may be formed in one side fixing structure 120, and one side connection part 353L of the third unit wire may be fixedly inserted into the groove 121 of one side fixing structure. Likewise, a groove 131, which is formed in the form of the other side connection part 354R of the fourth unit wire, may also be formed in the other side fixing structure 130, and the other side connection part 353R of the fourth unit wire may be fixedly inserted into the groove 131 of the other side fixing structure. As described above, the connection parts 353L and 354R of the third and fourth unit wires may each be formed in an approximately hexagonal shape, and the grooves 121 and 131, which have hexagonal shapes corresponding to the connection parts 353L and 354R, may be formed in one side fixing structure 120 and the other side fixing structure 130.

In addition, with reference to the above-mentioned description of the connecting terminal fixing structure 110, through-grooves may be formed in the connection parts 353L and 354R of the third and fourth unit wires, and the third and fourth unit wires 300U-3 and 300U-4 may be securely bound by penetratively inserting the fastening means, such as bolts, into the corresponding through-grooves. To this end, screw grooves 122 (see FIG. 14), to which the bolts may be fastened, may, of course, be further formed in bottoms of one side fixing structure 120 and the other side fixing structure 130. Further, guide grooves 123 (see FIG. 14), through which the unit wire may pass, may be respectively provided in the wall of one side fixing structure 120 and the wall of the other side fixing structure 130, and reinforcement ribs 129 (see FIG. 16) may be further respectively provided on the wall of one side fixing structure 120 and the wall of the other side fixing structure 130.

In addition, both one side fixing structure 120 and the other side fixing structure 130 may be disposed at one side rim of the casing 100 in the same direction. That is, as illustrated in FIG. 11, all the fixing structures of the present invention, i.e., one side fixing structure 120, the connecting terminal fixing structure 110, and the other side fixing structure 130 may be disposed at one side rim of the casing 100 in the same direction. This configuration may assist in improving the assemblability because the wire may be assembled in the casing in the same direction at the time of fastening the wire. Further, not only the connecting terminal fixing structures 110 are positioned at the same rim side, but also one side fixing structure 120 and the other side fixing structure 130 are positioned at the same rim side, such that all the unit wires may be disposed in the same shape, as described below.

With reference back to FIG. 12, in the present invention, the unit wires 300U may each define a single closed loop and be disposed to surround any one of the plurality of electrification plates 200. That is, one unit wire 300U may define a single closed loop and be disposed to surround one electrification plate 200 in one unit wire 300U. Therefore, as illustrated, one unit wire 300U' may be configured to cover an electrification plate 201 positioned at a left side of the corresponding unit wire 300U' based on the drawings, an electrification plate 202 positioned at a middle side of the closed loop of the corresponding unit wire 300U', and an electrification plate 203 positioned at the right side of the corresponding unit wire 300U'.

In this case, the unit wire 300U may include a discharge part 300U_a disposed in parallel with the electrification plate 200, and a connection part 300U_b bent and extending from an end of the discharge part 300U_a and disposed perpendicularly to the electrification plate 200. In this case, as described above, the unit wires 300U may each be formed to surround one electrification plate 200, such that the discharge parts 300U_a and the electrification plates 200 may be disposed alternately. The structure of the high-pressure circuit defined by the wire may be easily configured by using a minimum number of components.

Figure 19:
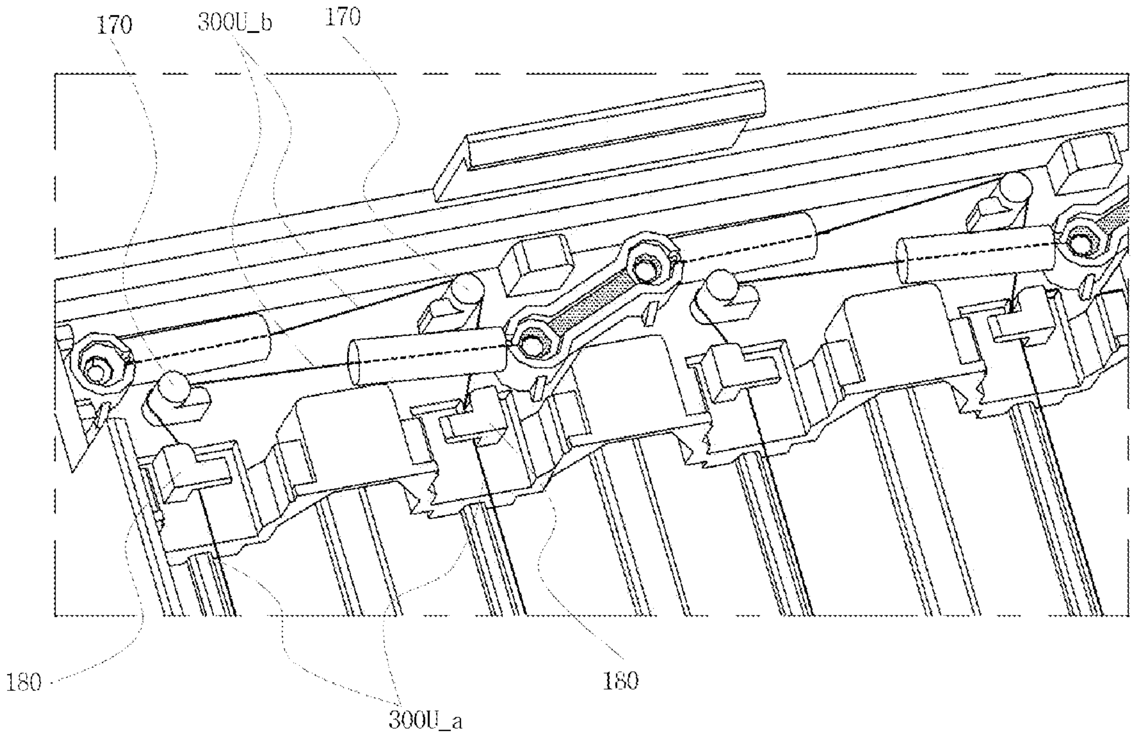
FIG. 19 is a view illustrating FIG. 11 again.

In this case, a configuration for bending the unit wire 300U or disposing the discharge part 300U_a in parallel with the electrification plate 200 may be provided in the casing 100. FIG. 19 is a view illustrating FIG. 16 again. As illustrated, support parts 170 and hook parts 180 may be provided in the casing 100 and protrude by predetermined heights from the bottom surface of the casing.

The support part 170 is configured to bend the direction of the unit wire 300U. The unit wire 300U is fixed by an outer surface of the support part 170, such that a traveling direction of the unit wire 300U may be changed, and the unit wire 300U may be divided into the discharge part 300U_a and the connection part 300U_b. As illustrated, the support part 170 may be formed in a cylindrical shape. Although not illustrated, a groove, which is recessed inward, may be formed in a central portion of the support part 170 so that the unit wire 300U may be seated in the groove, and the position of the unit wire 300U may be fixed.

The hook part 180 may allow the discharge part 300U_a of the unit wire 300U to be disposed in parallel with the electrification plate 200. A cap part extending horizontally may be formed on an upper portion of the hook part 180 and prevent the unit wire 300U from being withdrawn to the outside.

The plurality of support parts 170 and the plurality of hook parts 180 may be provided at one side and the other side of the casing 100 so that the unit wires 300U may define the closed loops. In this case, one side and the other side may be structured to be symmetric to each other.

Further, all the unit wires 300U of the present invention may have the same length and the same shape. That is, the first, second, third, and fourth unit wires 300U-1, 300U-2, 300U-3, and 300U-4 may have the same length, and all the connection part 350 may have the same shape. Therefore, all the unit wires may be manufactured in the same way, and the unit wires may be used at any position on the electrification unit, thereby improving the ease of production.

Meanwhile, in the above-mentioned description, the discharge electrode 300 has been described as being limited to the wire 300, and the electrification electrode 200 has been described as being limited to the electrification plate 200. However, the present invention is not limited thereto. Even though the discharge electrode is not the wire type or the electrification electrode is not the plate type, the above-mentioned connection structure between the unit wires, the fixing structures of the casing and the like may, of course, be applied to electrically connect the plurality of discharge electrodes 300 and the electrification electrodes 200.

As described above, according to the electrification unit of the present invention, the discharge electrode connects the plurality of unit discharge electrodes in a row by means of the connecting terminal, and the groove-shaped fixing structure is provided in the casing so that the connecting terminal and the connection part of the unit discharge electrode may be simply fixedly inserted into the corresponding groove, thereby providing excellent assemblability and electrical insulation and improving manufacturability and electrical stability.

Further, the present invention may further include the electrostatic precipitator 1 including the electrification unit 10, and the dust collection part 20 configured to collect dust particles having passed through the electrification unit 10.

While the embodiments of the present invention have been described with reference to the accompanying drawings, those skilled in the art will understand that the present invention may be carried out in any other specific form without changing the technical spirit or an essential feature thereof. Therefore, it should be understood that the above-described embodiments are illustrative in all aspects and do not limit the present invention.

DESCRIPTION OF REFERENCE NUMERALS

1: Electrostatic precipitator
10: Electrification unit
100: Casing
110: Connecting terminal fixing structure
120: One side fixing structure
130: The other side fixing structure
200: Electrification electrode (electrification plate)
300: Discharge electrode (wire)
300U: Unit discharge electrode (unit wire)
400: Connecting terminal
20: Dust collection part

What is claimed is:

1. An electrification unit, which is configured to apply electric charges to dust particles by receiving a voltage, the electrification unit comprising:

a casing;

a plurality of electrification electrodes disposed in the casing and spaced apart from one another; and a discharge electrode disposed between the plurality of electrification electrodes and spaced apart from the plurality of electrification electrodes, wherein the discharge electrode includes a plurality of unit discharge electrodes connected in a row, wherein two unit discharge electrodes are connected to each other by means of a connecting terminal, and wherein a connecting terminal fixing structure for accommodating the connecting terminal is provided in the casing, wherein connection parts are respectively provided at two ends of each of the plurality of unit discharge electrodes, wherein one unit discharge electrode of the two unit discharge electrodes, which is positioned at one side of the connecting terminal, is a first unit discharge electrode, and the unit discharge electrode positioned at another side of the connecting terminal is a second unit discharge electrode, wherein one side of the connecting terminal is connected to another side connection part of the first unit discharge electrode, and another side of the connecting terminal is connected to one side connection part of the second unit discharge electrode, wherein the other side connection part of the first unit discharge electrode, the connecting terminal, and one side connection part of the second unit discharge electrode are fixed by means of the connecting terminal fixing structure, and wherein the connecting terminal fixing structure includes a groove having a shape corresponding to the connecting terminal, and the other side connection part of the first unit discharge electrode, the connecting terminal, and one side connection part of the second unit discharge electrode are inserted into the groove.

2. The electrification unit of claim 1, wherein the connecting terminal fixing structure is formed as a partition wall protruding by a predetermined height from a bottom surface of the casing, and a portion of the partition wall of the connecting terminal fixing structure protrudes higher than the connecting terminal fixing structure inserted into the connecting terminal fixing structure and the connection part of the unit discharge electrode.

3. The electrification unit of claim 1, wherein a guide groove through which the unit discharge electrode passes is formed in a wall of the connecting terminal fixing structure.

4. The electrification unit of claim 1, wherein the connecting terminal has a plate shape and includes a middle portion and end portions respectively provided at two opposite ends of the middle portion.

5. The electrification unit of claim 4, wherein one end portion of the connecting terminal and another side connection part of the first unit discharge electrode are stacked on each other, and another end portion of the connecting terminal and one side connection part of the second unit discharge electrode are stacked on each other.

6. The electrification unit of claim 5, wherein one end portion of the connecting terminal and the other side connection part of the first unit discharge electrode have the same cross-sectional shape, and the other end portion of the connecting terminal and one side connection part of the second unit discharge electrode have the same cross-sectional shape.

7. The electrification unit of claim 5, wherein through-holes are respectively formed in one end portion and the other end portion of the connecting terminal, a through-hole is formed in the other side connection part of the first unit discharge electrode, and a through-hole is formed in one side connection part of the second unit discharge electrode, wherein one end portion of the connecting terminal and the other side connection part of the first unit discharge electrode are fastened to each other by means of fastening means that penetrate the through-hole of one end portion of the connecting terminal and the through-hole of the other side connection part of the first unit discharge electrode, and wherein the other end portion of the connecting terminal and one side connection part of the second unit discharge electrode are fastened to each other by means of fastening means that penetrate the through-hole of the other end portion of the connecting terminal and the through-hole of one side connection part of the second unit discharge electrode.

8. The electrification unit of claim 7, wherein the fastening means is a bolt, and a screw groove having a screw thread formed therein is formed in a bottom of the connecting terminal fixing structure so that the bolt is fastened to the screw groove.

9. The electrification unit of claim 5, wherein the middle portion of the connecting terminal is elongated, and a width of the end portion is larger than a width of the middle portion.

10. The electrification unit of claim 1, wherein upper exposed portions of the other side connection part of the first unit discharge electrode, the connecting terminal, and one side connection part of the second unit discharge electrode are coated with an insulating material.

11. The electrification unit of claim 1, wherein a cover is provided on upper exposed portions of the other side connection part of the first unit discharge electrode, the connecting terminal, and one side connection part of the second unit discharge electrode and closes the upper exposed portions.

12. The electrification unit of claim 1, wherein the connecting terminal fixing structure is provided at one side of the casing.

13. The electrification unit of claim 1, wherein among the plurality of unit discharge electrodes, the unit discharge electrode positioned at one side outermost periphery is a third unit discharge electrode, and the unit discharge electrode positioned at another side outermost periphery is a fourth unit discharge electrode, and wherein one side fixing structure for accommodating one side connection part of the third unit discharge electrode is further provided in the casing, and the other side fixing structure for accommodating the other side connection part of the fourth unit discharge electrode is further provided in the casing.

14. The electrification unit of claim 13, wherein a groove having a shape corresponding to one side connection part of the third unit discharge electrode is formed in one side fixing structure, and one side connection part of the third unit discharge electrode is inserted into the groove of one side fixing structure, and wherein a groove having a shape corresponding to the other side connection part of the fourth unit discharge electrode is formed in the other side fixing structure, and the other side connection part of the fourth unit discharge electrode is inserted into the groove of the other side fixing structure.

15. The electrification unit of claim 1, wherein the casing has a structure made by coupling a casing main body and a casing cover, and wherein the casing cover comprises:

a first casing cover detachably provided at one rim side inside the casing main body and configured to close one rim side; and a second casing cover detachably provided at the other rim side inside the casing main body and configured to close the other rim side.

16. The electrification unit of claim 1, wherein the discharge electrode is configured as a wire, and wherein the wire includes a plurality of unit wires connected in a row, and the two adjacent unit wires, among the unit wires connected in a row, are connected to each other by means of the connecting terminal.

17. The electrification unit of claim 16, wherein the plurality of unit wires each defines a closed loop as a whole and is disposed to surround any one of the plurality of electrification electrodes.

18. An electrostatic precipitator comprising:

the electrification unit of claim 1; and a dust collection part configured to collect dust particles having passed through the electrification unit.

* * * * *